United States Patent [19]
Collignon

[11] 3,979,994
[45] Sept. 14, 1976

[54] PIVOT PIN INCLUDING DETACHABLE PILOT SECTION

[75] Inventor: Gerard M. G. J. Collignon, Fleurus, Belgium

[73] Assignee: Caterpillar Tractor Co., Peoria, Ill.

[22] Filed: Jan. 23, 1975

[21] Appl. No.: 543,578

[52] U.S. Cl. ................................. 85/5 N; 29/271; 37/1; 85/1 P; 151/2 R; 403/14; 403/156
[51] Int. Cl.² ................. F16B 19/02; F16B 21/16; B25B 27/14
[58] Field of Search ............ 85/1 P, 32.1, 1 K, 1 S, 85/5 N, 5 R, 1 R; 151/2, 14 R; 403/13, 14, 316, 320, 378, 408, 161, 154–156; 37/103, 1; 29/271; 214/138 R

[56] References Cited
UNITED STATES PATENTS

| 162,077 | 4/1875 | Kellogg | 85/1 P |
|---|---|---|---|
| 442,455 | 12/1890 | Penrose | 85/1 P |
| 1,394,608 | 10/1921 | Davern | 29/271 UX |
| 1,555,603 | 9/1925 | Overing, Jr. | 403/156 |
| 1,570,565 | 1/1926 | Hanner | 151/2 R |
| 1,584,851 | 5/1926 | Crone | 85/5 R |
| 3,135,402 | 6/1964 | McCanse | 214/776 |
| 3,251,491 | 5/1966 | French et al. | 214/138 R |
| 3,339,953 | 9/1967 | Bohn | 85/32.1 X |
| 3,424,014 | 1/1969 | Harris | 403/161 X |
| 3,589,539 | 6/1971 | Witwer | 37/103 X |
| 3,600,015 | 8/1971 | McMullen | 403/156 |
| 3,606,047 | 9/1971 | Schaeff | 37/103 X |
| 3,742,557 | 7/1973 | Francois | 85/1 P X |
| 3,817,146 | 6/1974 | Scott | 85/1 P |

FOREIGN PATENTS OR APPLICATIONS

| 502,132 | 11/1954 | Italy | 85/1 P |
|---|---|---|---|

*Primary Examiner*—Edgar S. Burr
*Assistant Examiner*—Steven A. Bratlie
*Attorney, Agent, or Firm*—Phillips, Moore, Weissenberger Lempio & Strabala

[57] ABSTRACT

A mobile construction machine comprises a pair of working components pivotally connected together by a pin. The pin has a first stop means secured on a first end thereof to prevent longitudinal movement of the pin in a first direction relative to the components and a second stop means releasably attached to a second end of the pin to prevent it from moving in the opposite direction. Upon removal of the second stop means from the pin, the pin may be removed from aligned bores formed through the components to disconnect the same. Upon reinstallation of the pin, a conically shaped self-centering member is attached to the pin in lieu of the second stop means to facilitate reinsertion of the pin into the bores formed in the components.

3 Claims, 3 Drawing Figures

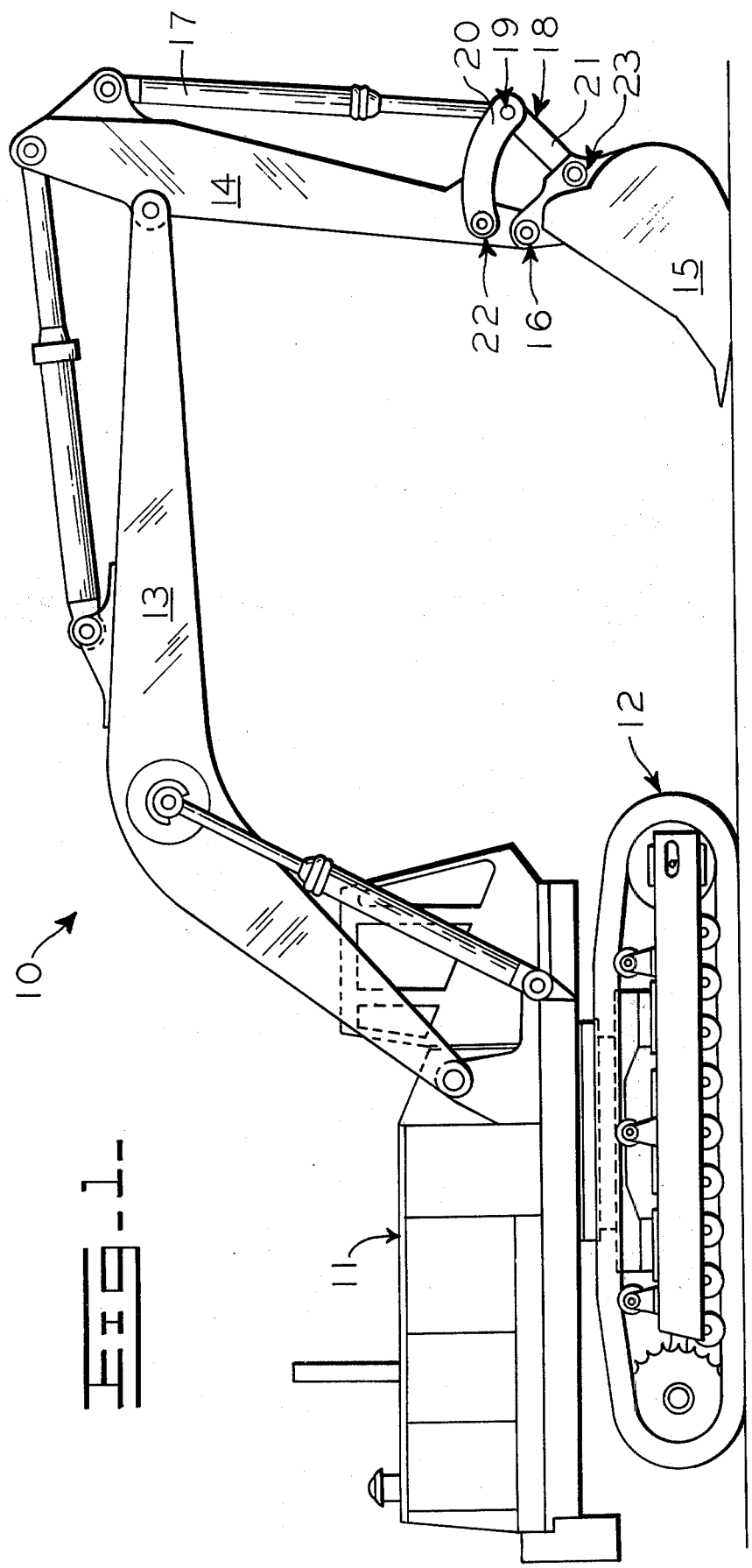

U.S. Patent  Sept. 14, 1976  Sheet 2 of 2  3,979,994
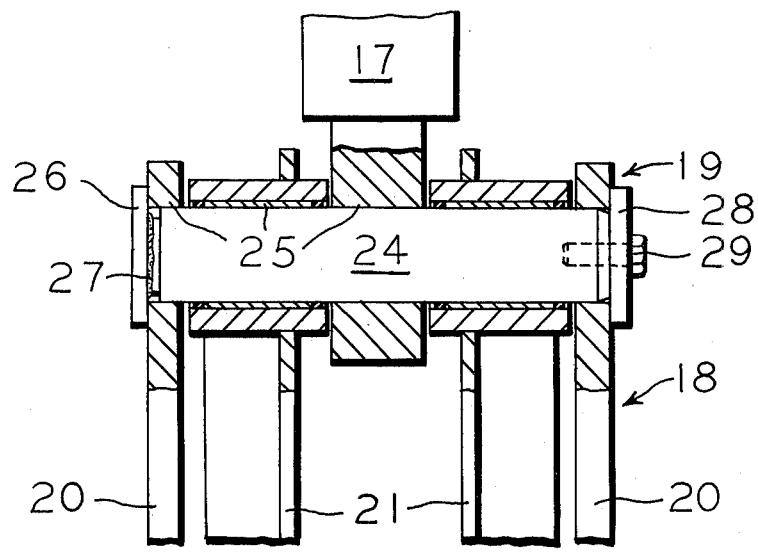
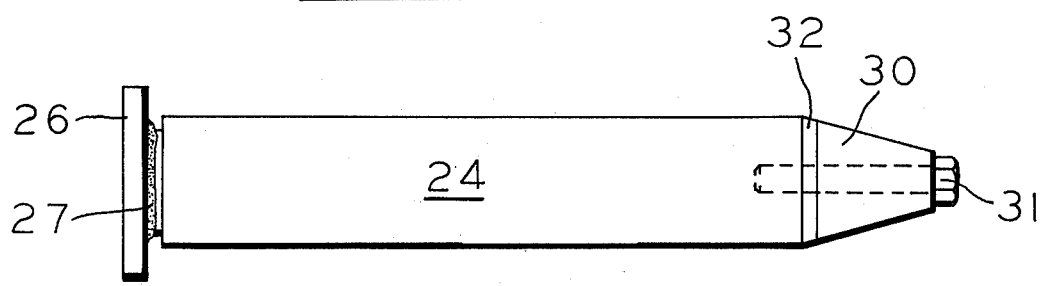

PIVOT PIN INCLUDING DETACHABLE PILOT SECTION

BACKGROUND OF THE INVENTION

The working components of large construction machines, such as hydraulic excavators, oftentimes require periodic field replacement and/or repair. Heretofore, tools such as drift pins, pilot pins and the like have been utilized to properly align bores formed in a pair of pivoted components, such as a bucket and hydraulic cylinder, and to reinstall a pivot pin therein. Such prior art tools and methods employed therewith are time-consuming and cumbersome to use.

SUMMARY OF THIS INVENTION

An object of this invention is to provide an economical and non-complex replaceable pivot pin for pivoted components of a construction machine, such as a hydraulic excavator. This invention further contemplates a method for expeditiously reattaching the components together by adapting the pin with a self-centering means upon reinstallation thereof in aligned bores formed in the components.

When the pin is attached to the components, it comprises a first stop means on a first end thereof for preventing the pin from moving longitudinally in a first direction and a second stop means releasably attached to a second end of the pin for preventing it from moving in an opposite direction. When it is desired to disconnect the components for repair and/or replacement purposes, the second stop means is removed from the pin and the pin is driven out of the aligned bores formed in the components. Upon reattachment of the components together, a tapered self-centering means is attached to the second end of the pin in lieu of the second stop means and aids in precisely driving the pin into the bores. The self-centering means is then removed from the pin and replaced with the second stop means.

BRIEF DESCRIPTION OF THE DRAWINGS

Other objects of this invention will become apparent from the following description and accompanying drawings wherein:

FIG. 1 is a side elevational view of a hydraulic excavator having certain working components thereof pivotally connected together by a pivot pin of this invention;

FIG. 2 is an enlarged sectional view of the components pivotally connected by pivot pin 19 of FIG. 1; and FIG. 3 is an enlarged plan view of the pin having self-centering means attached to an end thereof.

DETAILED DESCRIPTION

FIG. 1 illustrates a hydraulic excavator 10 comprising an upper unit 11 rotatably mounted on a tracked undercarriage 12 in a conventional manner. A boom 13 is pivotally mounted on a forward end of the upper unit and has a dipper arm 14 pivotally connected to a forward end thereof. A dipper or bucket 15 is pivotally mounted on a lower end of arm 14 by pivot means 16.

A double-acting hydraulic cylinder 17 has its upper end pivotally connected to the dipper arm and the lower end thereof pivotally connected to a linkage 18 by a pivot means 19 to selectively pivot the dipper on the dipper arm. The linkage means comprises a pair of links 20 and 21 having their first ends pivotally connected to the rod end of cylinder 17 by pivot means 19 and their second ends pivotally connected to dipper arm 14 and dipper 15 by pivot means 22 and 23, respectively. Although the invention is hereinafter described with respect to pivot means 19, it should be understood that such invention is also applicable to the pivotal connections for other working components of a mobile construction machine.

Referring to FIG. 2, pivot means 19 comprises a pivot pin 24 having its cylindrical body portion disposed in aligned bores 25 formed through the rod end of cylinder 17 and through links 20 and 21. A first stop means or plate 26 is secured to a first end of the pin by an annular weld 27 to extend radially outwardly from the pin to abut a link 20 to prevent the pin from moving longitudinally in a first, rightward direction relative thereto. A second stop means or plate 28, releasably attached to a second end of the pin by releasable fastening means such as a single cap screw 29, extends radially outwardly from the pin to abut other link 20 to prevent the pin from moving in a second and opposite longitudinal direction.

When it is desired to detach cylinder 17 from links 20 and 21, plate 28 is removed from pin 24 upon release of cap screw 29. The pin is then suitably driven leftwardly in FIG. 2 to effect such release. FIG. 3 illustrates the attachment of a frustoconically shaped self-centering member or means 30 on the second end of pin 24 by an elongated cap screw 31 prior to reinstallation of the pin to its FIG. 2 position.

The pin, having a frustoconically shaped end portion 32 formed thereon which is coincident with the outer conical surface of member 30, now further functions as a tool which is driven rightwardly in FIG. 2 through bores 25 whereafter member 30 is replaced by plate 28. As suggested above, the above-described pivot pin and method for installing the same are adapted for pivotally connecting and disconnecting other component parts of the machine, e.g., at pivot connections 16, 22, 23, etc.

I claim:

1. A self-centering combined pivot pin and tool for pivotally connecting a pair of working components of a machine together comprising a cylindrical body portion and a conically shaped self-centering means releasably attached to one end of said body portion by releasable fastening means, said self-centering means comprising a frustoconically-shaped member disposed on a centerline axis thereof and having a top and a base, said base disposed on the one end of said body portion and substantially coextensive therewith, said member extending outwardly from the one end of said body portion, with the top of said member lying in a plane substantially parallel relative to the base of said member and relative to the one end of said body portion and said releasable fastening means constituting a cap screw threadably attaching said member to the one end of said body portion, said cap screw inserted at the top of said member to threadably attach said member to said body portion via a bore axially disposed along the centerline axis of said member and said body portion.

2. The tool of claim 1 wherein a frustoconically-shaped surface is formed on the one end of said body portion to dispose the frustoconically-shaped surface of said body portion in matching and coincident relationship with outer surface portions of said frustoconically-shaped member.

3. The tool of claim 1 wherein said pivot pin further comprises stop means comprising an independent plate secured to an opposite end of said body portion and extending radially outwardly therefrom, and wherein said pivot pin is positioned by said stop means so that, upon removal of said member from said pin after insertion of said pin, the one end of said body portion lies flush with one of said components to thereby enable a second plate to be attached to the one end of said body portion of said pin by a cap screw to secure said body portion with respect to said components.

* * * * *